US012606243B2

(12) United States Patent
Shahriari et al.

(10) Patent No.:  US 12,606,243 B2
(45) Date of Patent:  Apr. 21, 2026

(54) PREDICTIVE ROAD BANKING FOR VEHICLES ON UNMAPPED ROADS

(71) Applicant: GM GLOBAL TECHNOLOGY OPERATIONS LLC, Detroit, MI (US)

(72) Inventors: Mohammadali Shahriari, Markham (CA); Parisa Mahvelatishamsabadi, North York (CA); Khizar A. Qureshi, Pickering (CA); Ashraf Abualfellat, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 18/739,678

(22) Filed: Jun. 11, 2024

(65) Prior Publication Data

US 2025/0376214 A1  Dec. 11, 2025

(51) Int. Cl.
B62D 15/02  (2006.01)
B62D 6/00  (2006.01)
G01C 21/00  (2006.01)

(52) U.S. Cl.
CPC ........... B62D 15/025 (2013.01); B62D 6/001 (2013.01); G01C 21/3822 (2020.08);
(Continued)

(58) Field of Classification Search
CPC ....... B60W 2420/40; B60W 2420/403; B60W 2420/408; B60W 2552/00; B60K 28/00–165; G05D 1/0061; G05D 1/0088; G05D 1/021; G05D 1/0214; G05D 1/0221; G05D 1/0223; B62D 6/001; B62D 15/025; G01C 21/3822
See application file for complete search history.

(56) References Cited

U.S. PATENT DOCUMENTS 10,435,072 B2 * 10/2019 Walsh .................. B62D 15/021
11,845,444 B2 * 12/2023 McGrory .............. B60W 40/13
(Continued)

FOREIGN PATENT DOCUMENTS

DE  102023101168 A1  2/2024
DE  102023112371 A1  6/2024

OTHER PUBLICATIONS

Kapania, N. et al., "Design of a feedback-feedforward steering controller for accurate path tracking and stability at the limits of handling", Vehicle System Dynamics: International Journal of Vehicle Mechanics and Mobility. (Year: 2015).*

*Primary Examiner* — Mark L. Greene
(74) *Attorney, Agent, or Firm* — Quinn IP Law

(57) ABSTRACT

A system and method for predictive vehicle road bank control on an unmapped road. A sensor within a vehicle, based on received sensor data, determines upcoming cross-slope roadway characteristics of an unmapped road, where the unmapped road comprises an absence of known cross-slope roadway characteristics. The vehicle creates a road model map based on the upcoming cross slope roadway characteristics of the unmapped road and predicts, based on the road model map, one or more bank angles at multiple look-ahead points of the upcoming roadway. The vehicle, based on the predicting of one or more bank angles, generates one or more steering control signals to compensate for the one or more bank angles at the multiple look-ahead points.

20 Claims, 10 Drawing Sheets

300

(52) U.S. Cl.
   CPC . *B60W 2420/403* (2013.01); *B60W 2420/408*
                  (2024.01); *B60W 2552/00* (2020.02)

(56)                        References Cited

U.S. PATENT DOCUMENTS

2022/0274602 A1*   9/2022   Zarringhalam  .....  B60W 40/072
2023/0064300 A1*   3/2023   McGrory  ..............  B60W 30/02
2023/0140569 A1*   5/2023   Foster  .................  B60W 30/146
                                                        701/400
2024/0140479 A1*   5/2024   Asher  .................  B60W 60/001

* cited by examiner

100

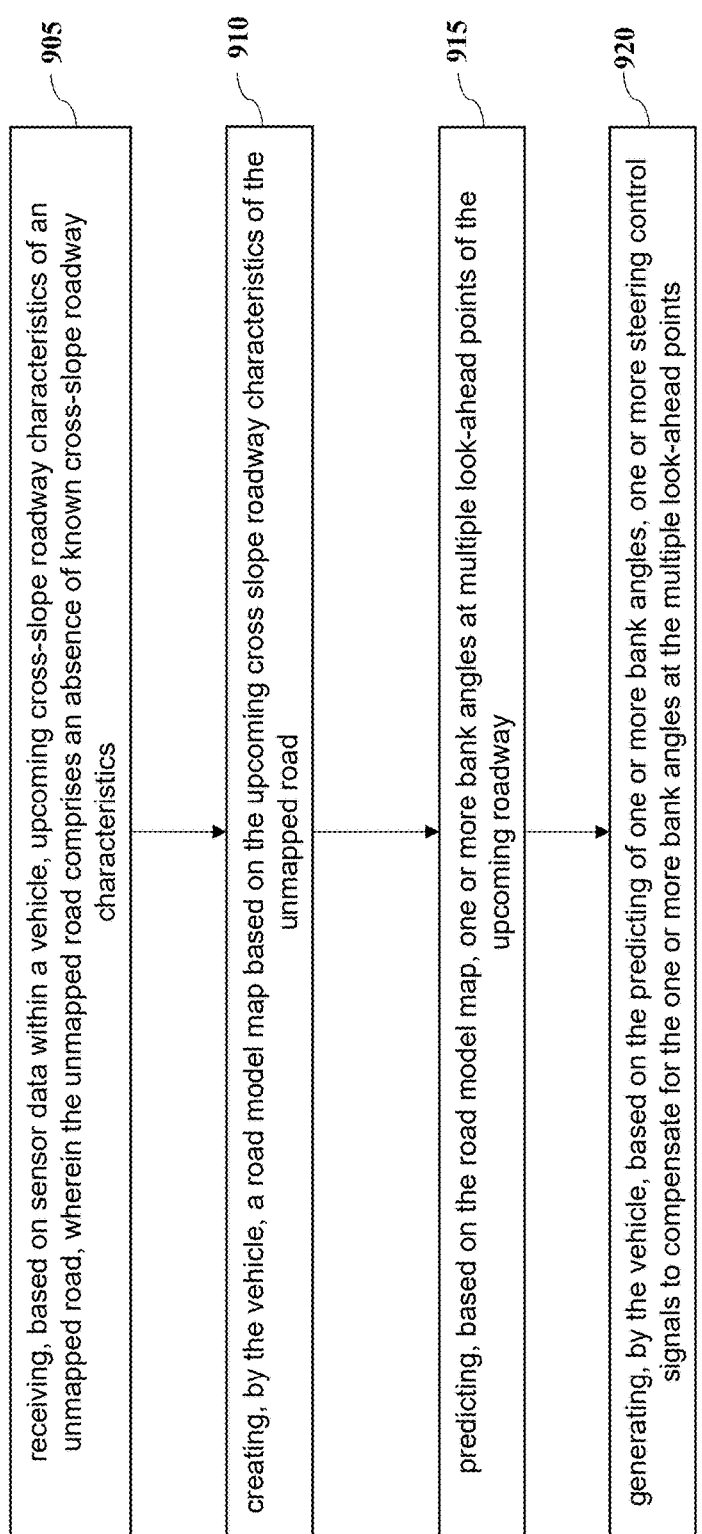

900

905 receiving, based on sensor data within a vehicle, upcoming cross-slope roadway characteristics of an unmapped road, wherein the unmapped road comprises an absence of known cross-slope roadway characteristics

910 creating, by the vehicle, a road model map based on the upcoming cross slope roadway characteristics of the unmapped road

915 predicting, based on the road model map, one or more bank angles at multiple look-ahead points of the upcoming roadway

920 generating, by the vehicle, based on the predicting of one or more bank angles, one or more steering control signals to compensate for the one or more bank angles at the multiple look-ahead points

FIG. 9

PREDICTIVE ROAD BANKING FOR VEHICLES ON UNMAPPED ROADS

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as autonomous driving controls, body control, camera vision, information display, security, and predictive look ahead estimation.

Vehicle body control may include assessing the consequences of speed, steering angle, and a banking angle of a road, especially on a curve. Roads may be banked to provide more control and stability of a vehicle in a curve. However, an incorrect estimation of the degree of banking may result in a driver understeering or oversteering in anticipation of the curve resulting in reactive adjustments to keep the vehicle in control.

SUMMARY

Disclosed herein are a system and methods for predictive vehicle road bank control on an unmapped road. Mapped roads, in the context of this disclosure, may refer to roads that have been scanned and mapped such that possible predictions of cross-slope or road banking may be determined. For example, such mapping may include satellite imaging that may ascertain the curvature of the road while street level mapping may indicate the slope or bank of a road. Alternatively, unmapped roads may not have this type of information available and hence the ability to estimate or anticipate road curvature and/or banking levels may not be readily available.

As disclosed herein, predictive vehicle road bank control on an unmapped road may include receiving, based on sensor data within a vehicle, upcoming cross-slope roadway characteristics of an unmapped road, where the unmapped road comprises an absence of known cross-slope roadway characteristics. The method may continue by creating, by the vehicle, a road model map based on the upcoming cross slope roadway characteristics of the unmapped road and then by predicting, based on the road model map, one or more bank angles at multiple look-ahead points of the upcoming roadway. The method may include generating, by the vehicle, based on the predicting of one or more bank angles, one or more steering control signals to compensate for the one or more bank angles at the multiple look-ahead points.

Another aspect of the method may include where the sensor data includes data from a front camera module.

Another aspect of the method may include where the sensor data comprises data from a light detecting and ranging (LIDAR) sensor.

Another aspect of the method may further include where the generating the one or more steering control signals includes inputs from a wheel speed sensor, an inertial measurement unit, and a steering angle sensor.

Another aspect of the method may include where the predicting of the one or more bank angles at multiple look-ahead points of the upcoming roadway includes inputs from a high-definition map.

Another aspect of the method may further include recursive learning of the road model map for future predictions of cross-slope roadway characteristics.

Another aspect of the method may include calculating a slope ratio of $R_b = \theta_b/\rho_v$, where $R_b$ represents a learned roadway cross-slope ratio, $\theta_b$ represents a cross-slope bank angle of a roadway from an inertial measurement unit, and $\rho_v$ represents an estimated vehicle curvature based on inertial measurement unit data and a speed of the vehicle.

Another aspect of the method may include predicting a bank angle of an upcoming roadway where $\theta_{b,\ LA} = \rho_{LA}{}^{*}R_b$, in which $\theta_b$. LA represents a predicted cross-slope bank angle of a roadway at one or more look-ahead points, $\rho_{LA}$ represents a curvature of the vehicle at one or more look-ahead points, and $R_b$ represents a learned roadway cross-slope ratio.

Another aspect of the method may include predicting a bank angle of an upcoming roadway based on a current road bank angle from an inertial measurement unit and on a look ahead vehicle curvature.

Another aspect of the method may include determining if the predicted one or more bank angles at multiple look-ahead points exceeds a threshold limit.

As disclosed herein, a system for predictive vehicle road bank control on an unmapped road may include a sensor, within a vehicle, configured to capture, upcoming cross-slope roadway characteristics of an unmapped road, where the unmapped road includes an absence of known cross-slope roadway characteristics. The system may also include a trajectory control system, within the vehicle, to generate a road model map based on the upcoming cross slope roadway characteristics of the unmapped road. The system may also include a bank prediction observer, within the vehicle, to predict, based on the road model map, one or more bank angles at multiple look-ahead points of the upcoming roadway. The system may also include a steering control system, within the vehicle, to generate, based on the predicting of one or more bank angles, one or more steering control signals to compensate for the one or more bank angles at the multiple look-ahead points.

Another aspect of the disclosure may be a system where the sensor includes a front camera module.

Another aspect of the disclosure may be a system where the sensor includes a light detecting and ranging (LIDAR) sensor.

Another aspect of the disclosure may be a system where the steering control system includes a wheel speed sensor, an inertial measurement unit, and a steering angle sensor.

Another aspect of the disclosure may be a system where the bank prediction observer receives a high-definition map, where the high-definition map assists in the predicting, based on the road model map, the one or more bank angles at multiple look-ahead points of the upcoming roadway.

Another aspect of the disclosure may be a system that includes a steering control system to receive steering feedback control from the trajectory control system to generate a model based steering feed forward control.

Another aspect of the disclosure may be a system that includes an actuator control system to receive the one or more steering control signals and effectuate one or more vehicle steering actions.

Another aspect of the disclosure may be a system where the trajectory control system receives understeer coefficient learning data.

Another aspect of the disclosure may be a system where the trajectory control system receives a tire cornering stiffness learning data.

Another aspect of the disclosure may include a method for predictive vehicle road bank control on an unmapped road that includes receiving, based on sensor data within a vehicle, upcoming cross-slope roadway characteristics of an unmapped road, where the unmapped road includes an absence of known cross-slope roadway characteristics, and where the sensor data includes data from a front camera module or a light detecting and ranging (LIDAR) sensor. The method may include creating, by the vehicle, a road model map based on the upcoming cross slope roadway characteristics of the unmapped road and predicting, based on the road model map, one or more bank angles at multiple look-ahead points of the upcoming roadway, where the predicting of the one or more bank angles at multiple look-ahead points of the upcoming roadway may include inputs from a high definition map. The method may also include generating, by the vehicle, based on the predicting of one or more bank angles, one or more steering control signals to compensate for the one or more bank angles at the multiple look-ahead points, where the generating the one or more steering control signals may include inputs from a wheel speed sensor, an inertial measurement unit, and a steering angle sensor. The method may then determine if the predicted one or more bank angles at multiple look-ahead points exceeds a threshold limit.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 9 is a flowchart of a method for predictive vehicle road bank control on an unmapped road, in accordance with the disclosure.

Figure 1:
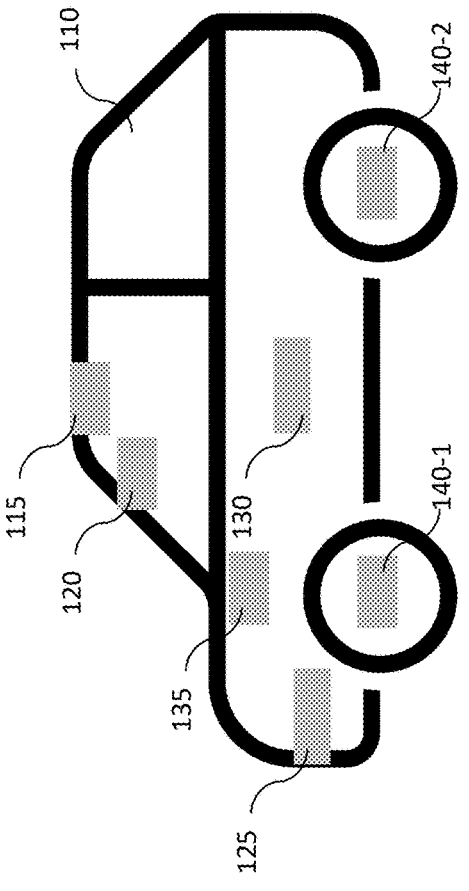
FIG. 1 is an illustration of a variety of possible vehicle sensors, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110*a*" and "110*b*" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information about the vehicle, the roadway, and the immediate surroundings, to name a few. These systems may also provide detailed data as to the operation, control, and responsiveness of a vehicle. Such information may be combined with remote databases, for example high-definition mapping systems, to provide additional information in the control and operation of the vehicle. Further, the vehicle may also communicate with other systems and databases on conditions of the vehicle and roadway in an effort to learn and predict roadway characteristics for other vehicles and systems.

As used herein, the terms "vehicle" and "motor vehicle" may be used interchangeably and synonymously to include relevant vehicle platforms, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, aircraft, watercraft, spacecraft, e-bikes, etc.

FIG. 1 is an illustration of a vehicle with integrated sensors 100, according to an embodiment of the present disclosure. Such sensors may assist in determining information about the location of the vehicle, its surroundings, and operational characteristics such as speed, direction, steering angle, etc. For example, vehicle 110 may include a Light Detection And Ranging (Lidar) sensor 115, a camera sensor 120, an ultrasonic sensor 125, an inertial measurement unit (IMU) sensor 130, a steering angle sensor 135, and wheel speed sensors 140-1 and 140-2.

Figures 2A, 2B, 2C:
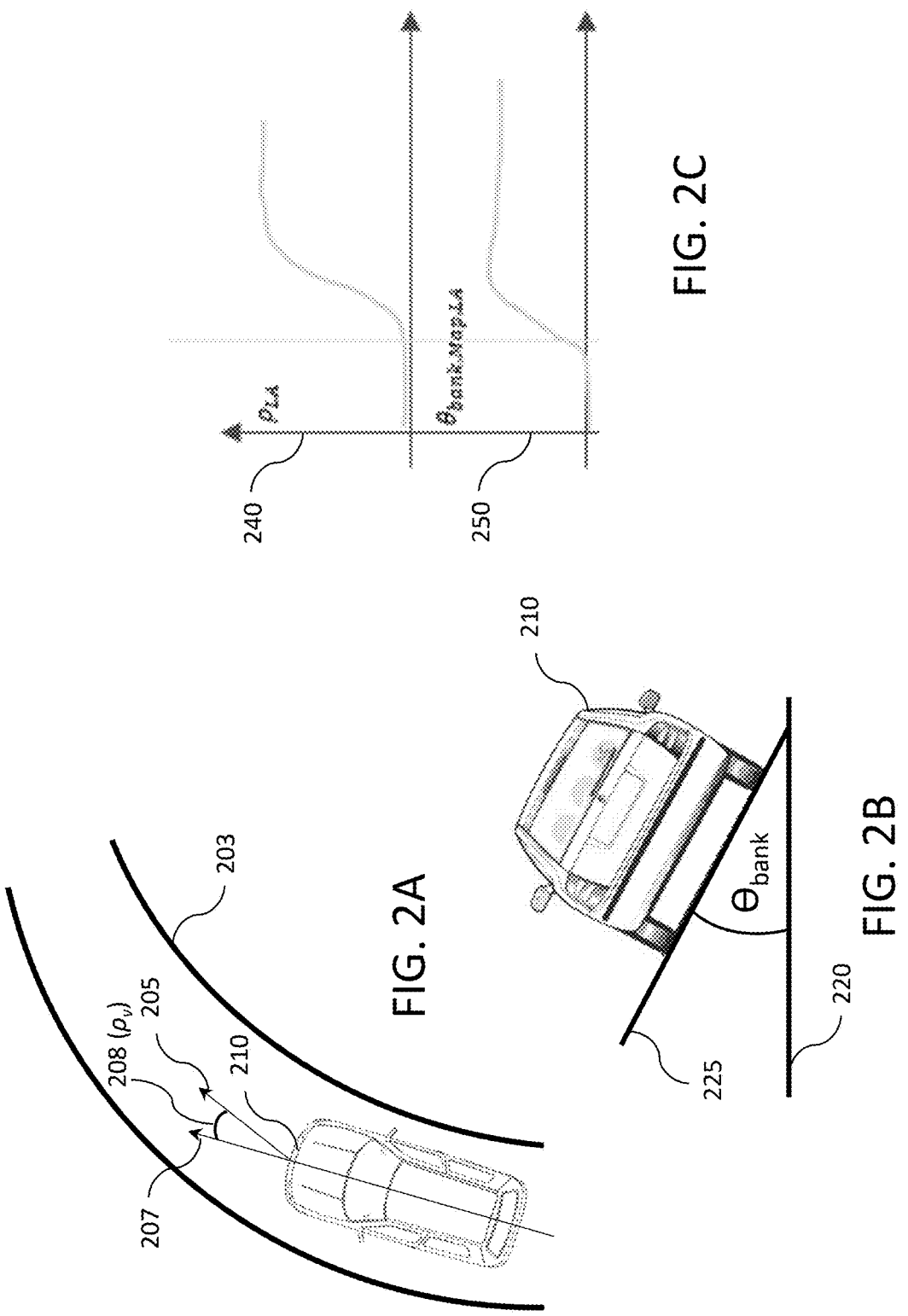
FIGS. 2A, 2B, and 2C are illustrations of vehicle curvature, bank angles, and graphing of vehicle curvature and bank angles over time, in accordance with the disclosure.

FIG. 2A illustrates the concept of vehicle curvature. FIG. 2A includes a curved roadway 203 on which vehicle 210 may travel. Vehicle 210 is shown with a forward orientation 207, but to keep the vehicle on roadway 203, vehicle 210 may execute a steering angle input in direction 205 to keep vehicle 210 within the roadway. Thus, vehicle curvature 208 of vehicle 210, is shown as $\rho_v$, and represents the angle of curvature that vehicle 210 executes to maintain its position on a curve within roadway 203. As will be discussed, vehicle curvature may be used, along with the vehicle's current banking angle to predict a look ahead banking angle, where the vehicle curvature may be a function of the speed of the vehicle, a current cross-slope bank angle of a roadway, and one or more steering control signals.

FIG. 2B illustrates the concept of cross-slope roadway, which is also referred to as a bank angle, or roadway bank, or roadway bank angle. Numerous roadways are built with banked curves that make it safer for vehicles to round a turn, especially at higher speeds. In a banked curve, unlike in an unbanked curve, there is a horizontal component of the normal force, which contributes to the centripetal force that keeps the object in its circular path without slipping. In other words, lateral control may require a banking angle to compensate for lateral gravitational force. In extreme examples, for example, some high-speed races, a banked curve may approach a ninety-degree vertical angle, thus allowing the racer to essentially travel in a straight line while rounding a turn. Thus, FIG. 2B illustrates vehicle 210 traveling on a banked curve 225 with a banked angle shown as $\theta_{bank}$ that is the angle between the horizontal plane 220 and the banked curve 225.

FIG. 2C illustrates the associated vehicle curvature $\rho_v$ and the bank angle $\theta_{bank}$. As will be discussed later, FIG. 2C actually is shown graphing a "look ahead" value that is the estimated look ahead vehicle curvature, shown in graph 240, and the estimated look ahead banking angle, shown in graph 250.

Figure 3A:
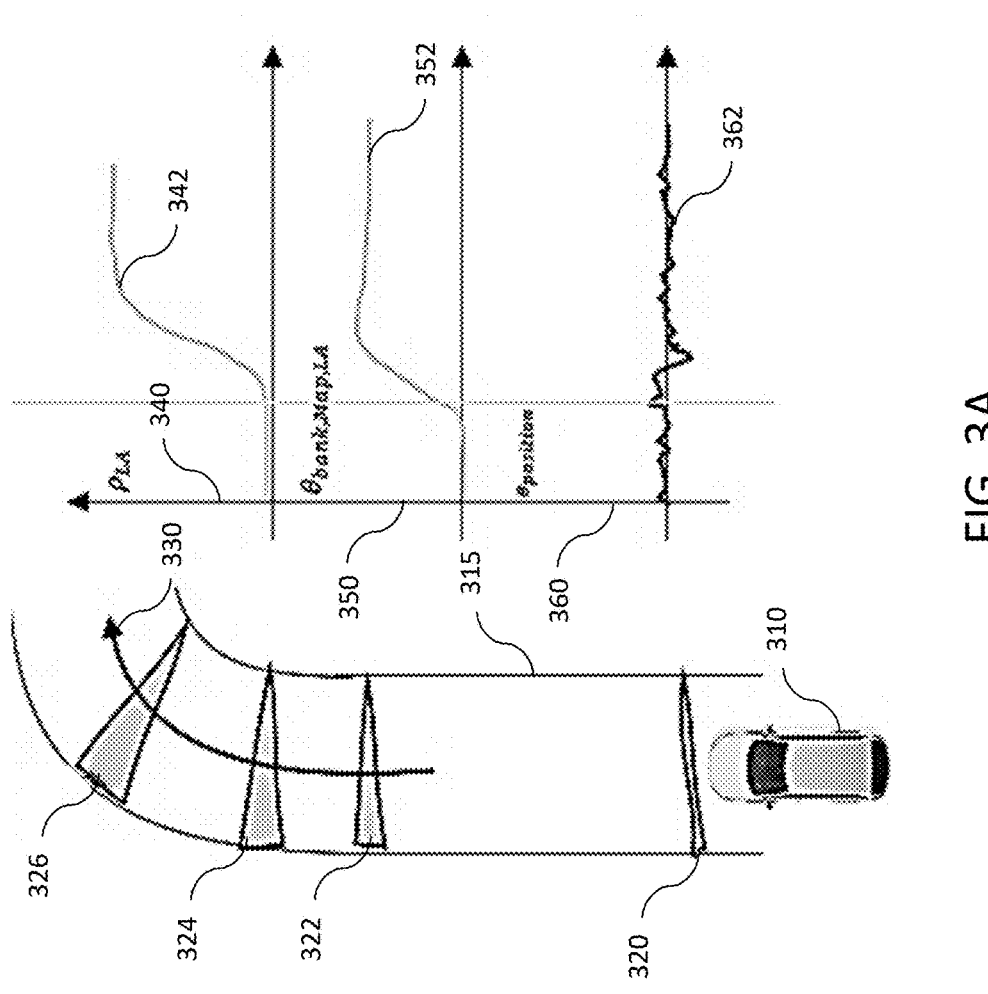
FIGS. 3A and 3B depict detection and actual travel associated with cross-slope roadway characteristics, in accordance with the disclosure.

FIG. 3A depicts a vehicle entering a curved roadway under mapped conditions 300, according to an embodiment of the present disclosure. On a mapped roadway, for example, there may exist a high-definition map that contains data, or metadata, regarding cross-slope data for a particular portion of a roadway. In such a situation it is possible to proactively institute bank compensation using predicted bank angles at various look ahead points based on the high-definition map data. For example, vehicle 310 is shown about to enter curved roadway 315. However, in the case of a mapped roadway, various look ahead points with cross-slope data may be utilized to calculate an optimal path through the curve on the roadway. For example, look ahead points at cross-slope points 320, 322, 324, and 326 may each contain data associated with each of their associated banking angles. Thus, based on the look ahead bank angles from the map, shown in graph 350 as plot 352, an optimal path 330 may be devised. Further, as shown in graph 340 as plot 342, vehicle curvature $\rho_v$ and banking angles may be correlated and thus such vehicle curvature information may be used to assist in the predicted look ahead banking angles. This may be especially true where road information may not be available through other sources, such as a high-definition map. In addition, such data may be used by vehicle 310, for example, in an assisted driving mode, to generate steering angle commands to maintain an optimal path. Such a result may be shown in graph 360 showing a minimal error position offset 362 of vehicle 310 versus an optimal zero offset path.

Figure 3B:
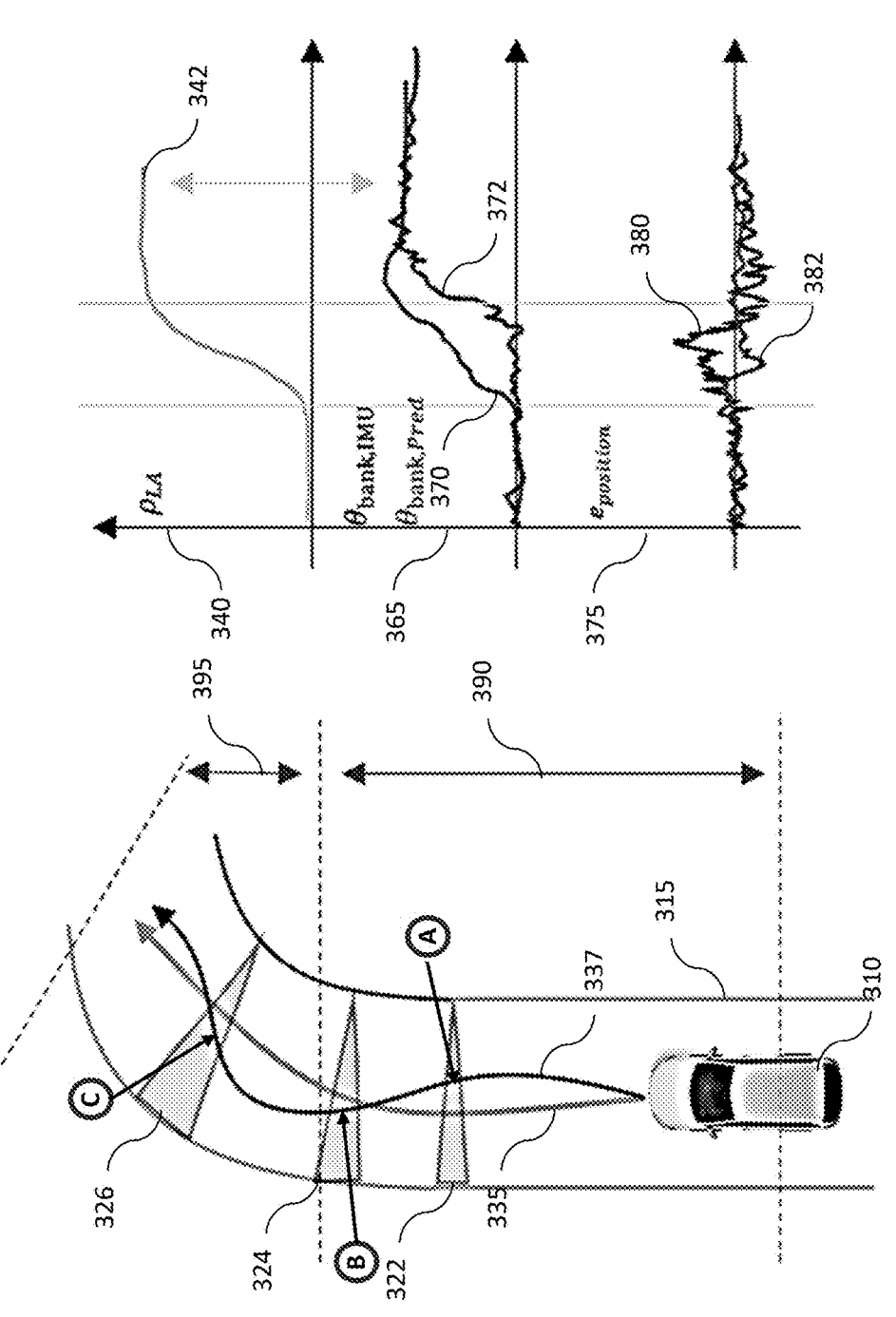

FIG. 3B depicts a vehicle entering a curved roadway under unmapped conditions 300', according to an embodiment of the present disclosure. In an embodiment, under unmapped conditions, vehicle 310 may rely on internal sensors to detect banking angles and adjust accordingly. For example, FIG. 3B illustrates vehicle 310 entering curved roadway 315, without the use of look ahead predictive banking information and thus relying on its internal inertial measurement unit (IMU) to detect movement and displacement of vehicle 310, such as when vehicle 310 banks on a cross slope of roadway 315 in which the IMU in vehicle 310 may detect a banking angle of vehicle 310.

However, without the use of look ahead predictive banking information control, information received from internal vehicle sensors, for example, the IMU, may occur at the time of detection and thus may be late in the ability for the vehicle to control or anticipate a change in banking angle. In an example, vehicle 310 may be traveling on path 337, where the IMU may detect cross-slope point 322 at location "A" and instead of being a predictive control, based on the detected bank information from the IMU, the vehicle may initiate a steering command in response to the IMU information and thus, in this example, veer leftward to compensate for the banking angle. Such information from the IMU may represent current conditions, not a look ahead prediction, and thus the vehicle's travel may result in the overshoot/undershoot behavior as shown in path 337. In contrast, path 335 represents an optimal path for vehicle 310 that may result from correctly predicting upcoming bank angle in conjunction with other vehicle inputs such as from a wheel speed sensor and the IMU.

The lack of predictive control is further illustrated where at location "B" the IMU in vehicle 310 may detect cross-slope point 324 at location "B" and based on the detected bank reactively initiate a steering command rightward to compensate for the banking angle. At location "C" the IMU in vehicle 310 may detect cross-slope point 326 at location "C" and based on the detected bank reactively initiate a steering command leftward to compensate for the banking angle. Without predictive look ahead control information, the steering corrections initiated by vehicle 310 along path 337 are reactive in nature and represent an over/undershoot of control in between the bank transitions. As will be discussed later, additional vehicle sensors may be utilized during prediction phase 390, which may be referred to as a prediction phase to predict upcoming bank angles, and during period 395, which may be referred to as a learning phase to learn the road model for future predictions.

FIG. 3B also illustrates the vehicle 310's curvature $\rho_{LA}$ in graph 340 as plot 342. Graph 365 represents a predicted banking angle $\theta_{bank,\ Pred}$ at plot 370, as compared with the banking angle as detected by the IMU as $\theta_{bank,\ IMU}$ at plot 372. Notice that $\theta_{bank,\ IMU}$ at plot 372 lags the predicted banking angles $\theta_{bank,\ Pred}$ in plot 370 reflecting vehicle 310's reactive nature to its IMU information. This lag in detecting the banking angles is also reflected in the position error, $e_{position}$ shown in graph 375 as plot 380 versus an optimal error position set shown in plot 382. Further, the predicted banking angles $\theta_{bank,\ Pred}$ in plot 370 may also be similar to information available from a high-definition map.

Figure 4:
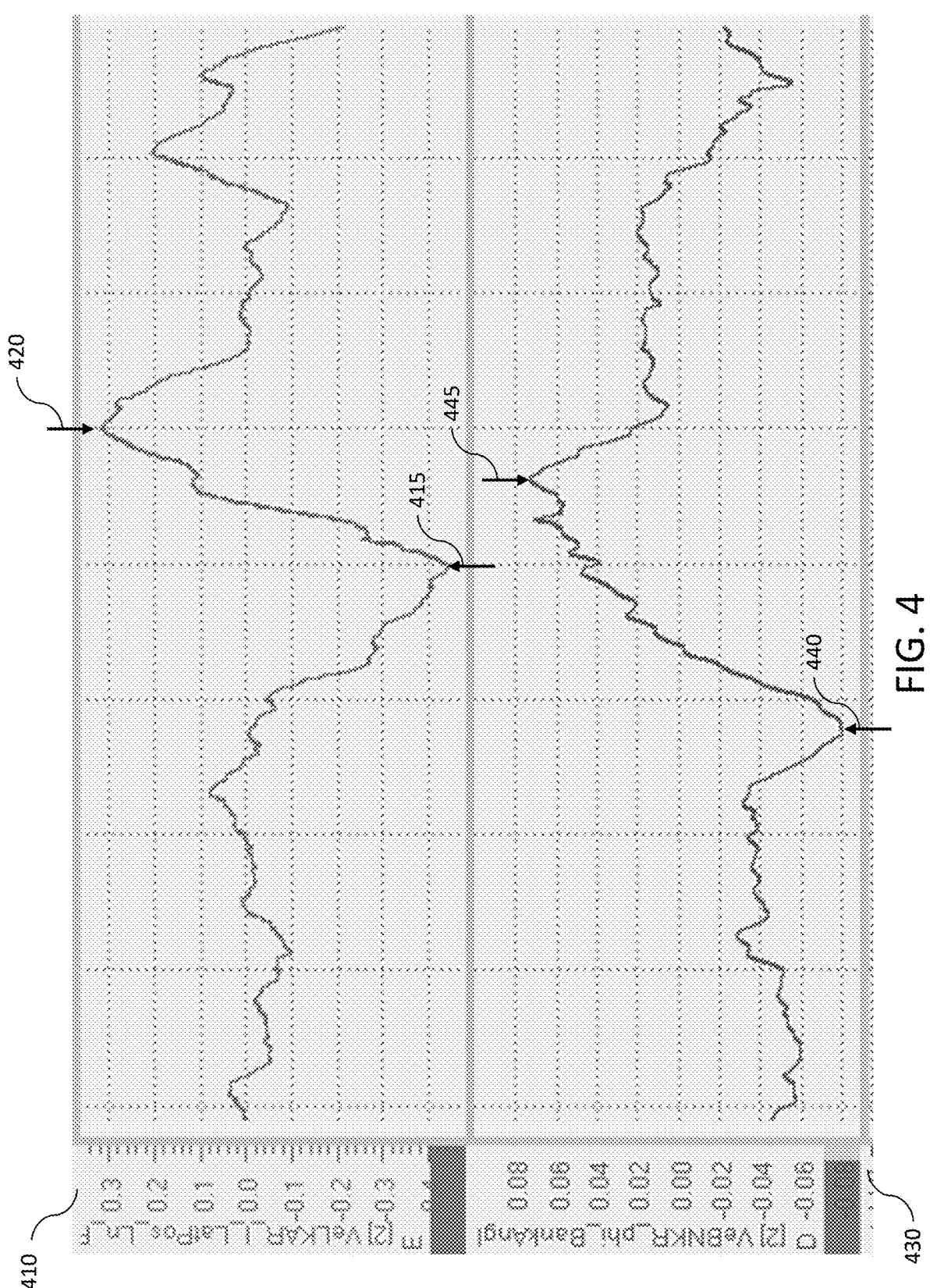
FIG. 4 is an illustration of vehicle responsiveness in mapped and unmapped cross-slope banking occurrences, in accordance with the disclosure.

FIG. 4 is an illustration of vehicle responsiveness where there is a lack of predicted bank angle information, according to an embodiment of the present disclosure. Graph 410 represents the use of reactive IMU data to compensate for cross-slope roadway characteristics as discussed in FIG. 3. As shown in graph 410, by relying on IMU reactive data to compensate for cross-slope bank angles the vehicle exhibits, in this example, greater than 0.3 meters of under and oversteer are shown at points 415 and 420. Graph 430 represents the corresponding IMU bank data. Note the lag between points 440 of IMU data with the vehicle position data at point 415, and also the lag between points 445 of IMU data with the vehicle position data at point 420.

Figure 5:
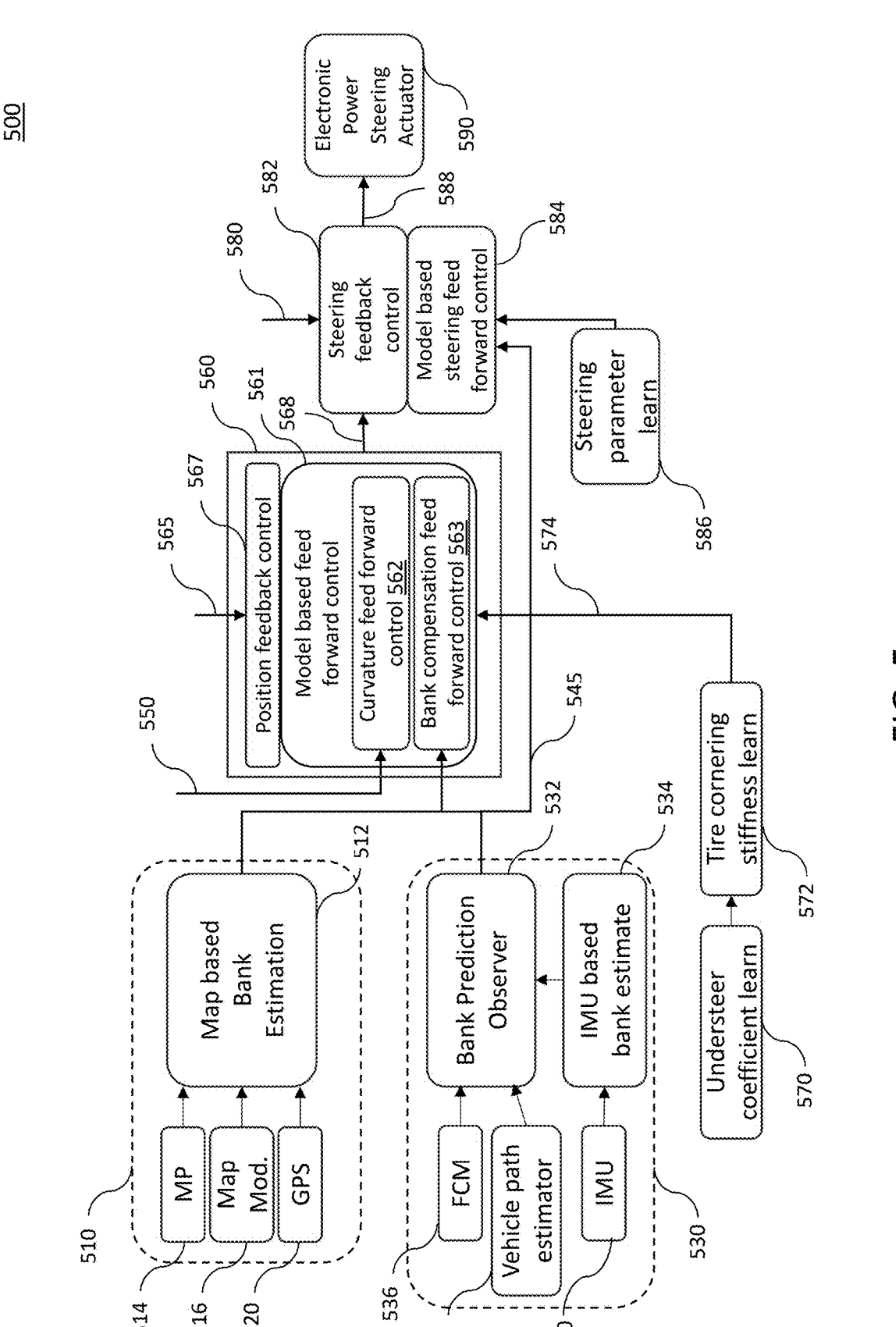
FIG. 5 depicts a possible data flow chart for trajectory control and steering control in mapped and unmapped roads, in accordance with the disclosure.

Thus, in turning to FIG. 5, the focus of this disclosure is to improve vehicle control and compensation for cross-slope characteristics of a roadway for unmapped roads.

FIG. 5 depicts a data flow system 500 for trajectory and steering control on both mapped and unmapped roads, according to an embodiment of the present disclosure. Mapped road bank estimation system 510 may estimate bank angles at look ahead points 545 on a roadway. Unmapped road bank estimation system 530 may also estimate bank angles at look ahead points 545 on a roadway.

Mapped road bank estimation system 510 may include map-based bank estimation system 512, map planner 514, map module 516, and global positioning system 520. Map planner 514 may include the ability to receive satellite mapping data, including real-time mapping information that may include visual data and/or metadata. Map module 516 may include the ability to receive, in real time, high-definition maps with metadata including bank angles of the roadway. Map module 516 may also include off-line maps inclusive of the same or similar information. Global positioning system 520 may also include other types of global navigation satellite system (GNSS). The outputs of the map planner 514, Map module 516, and global positioning system 520 may be forwarded to the map-based bank estimation system 512 to determine one or more banking angles are various look ahead points. As discussed in FIG. 2 and FIG. 3, the look ahead points may be various points ahead on the roadway, including upcoming curves. These banking angles at various look ahead points may then be forwarded to the trajectory control system 560.

Unmapped road bank estimation system 530 may include bank prediction observer system 532 (which will be discussed in detail in FIG. 6), and inertial measurement unit (IMU) based estimate system 534. Inputs to the bank prediction observer system 532 may include front camera module 536, the vehicle path estimator 538 and the IMU based estimate system 534. IMU based estimate system 534 may also include input from the inertial measurement unit 540. Front camera module 536 may provide a visual image in which banking angles may be ascertained from identified look ahead points and may also provide a look ahead curvature that may be used to assist in predicting look ahead banking. In addition, other technologies may also be incorporated to provide such images, for example, a light detecting and ranging (LIDAR) sensor or other types of imaging sensors. Based on the inputs to the bank prediction observer system 532 it will output one or more banking angles at various look ahead points that are forwarded to the bank compensation feed forward control system 563 located within the trajectory control system 560.

Trajectory control system 560 may include a position feedback control system 567, a model-based feed forward control system 561, where the model-based feed forward control system 561 may also include a curvature feed forward control system 562 and the bank compensation feed forward control system 563.

Model based feed forward control system 561 may be used to determine a modular road model using standard vehicle sensors with the additional ability to learn in real-time utilizing fast convergence adaptation methods. The road model is targeted to proactively estimate the banking angles at different look ahead points without the prior knowledge of a roadway, in real-time. As will be discussed, actual testing results have shown that effective bank angle prediction may be made up to 100 meters ahead using a front camera module.

Model based feed forward control system 561 may accept as input data from position feedback control system 567, that uses vehicle path 565 data to establish the location and path of a vehicle, for example, vehicle 310. Further, in developing the road model, the model based feed forward control system 561 uses data from the curvature feed forward control system 562 that utilizes desired path data 550 to determine a desired or optimal vehicle path, for example, the path 335 discussed in FIG. 3B. Combined with bank compensation feed forward control system 563 that is based upon the estimated bank angles at look ahead points 545 on a roadway from the mapped road bank estimation system 510 and/or the unmapped road bank estimation system 530.

The bank compensation feed forward control system 563 may also accept input 574 from the understeer coefficient learn module 570 and the tire cornering stiffness learn module 572 that may provide additional data regarding the amount of understeer associated with a vehicle and an associated tire cornering stiffness of the actual tires on the vehicle.

Based on this information, trajectory control system 560 may forward its results 568 to the steering feedback control system 582, where based on driver steering input 580 and the results of model based steering feed forward control system 584, an appropriate actuator input signal 588 may be generated. In addition, model based steering feed forward control system 584 may accept learning parameters from the steering parameter learn module 586.

Electronic power steering actuator 590 may then implement the appropriate steering controls to correct and/or compensate for the one or more bank angles at the multiple look-ahead points originally detected in the unmapped road bank estimation system 530, or in the mapped road bank estimation system 510.

Figure 6:
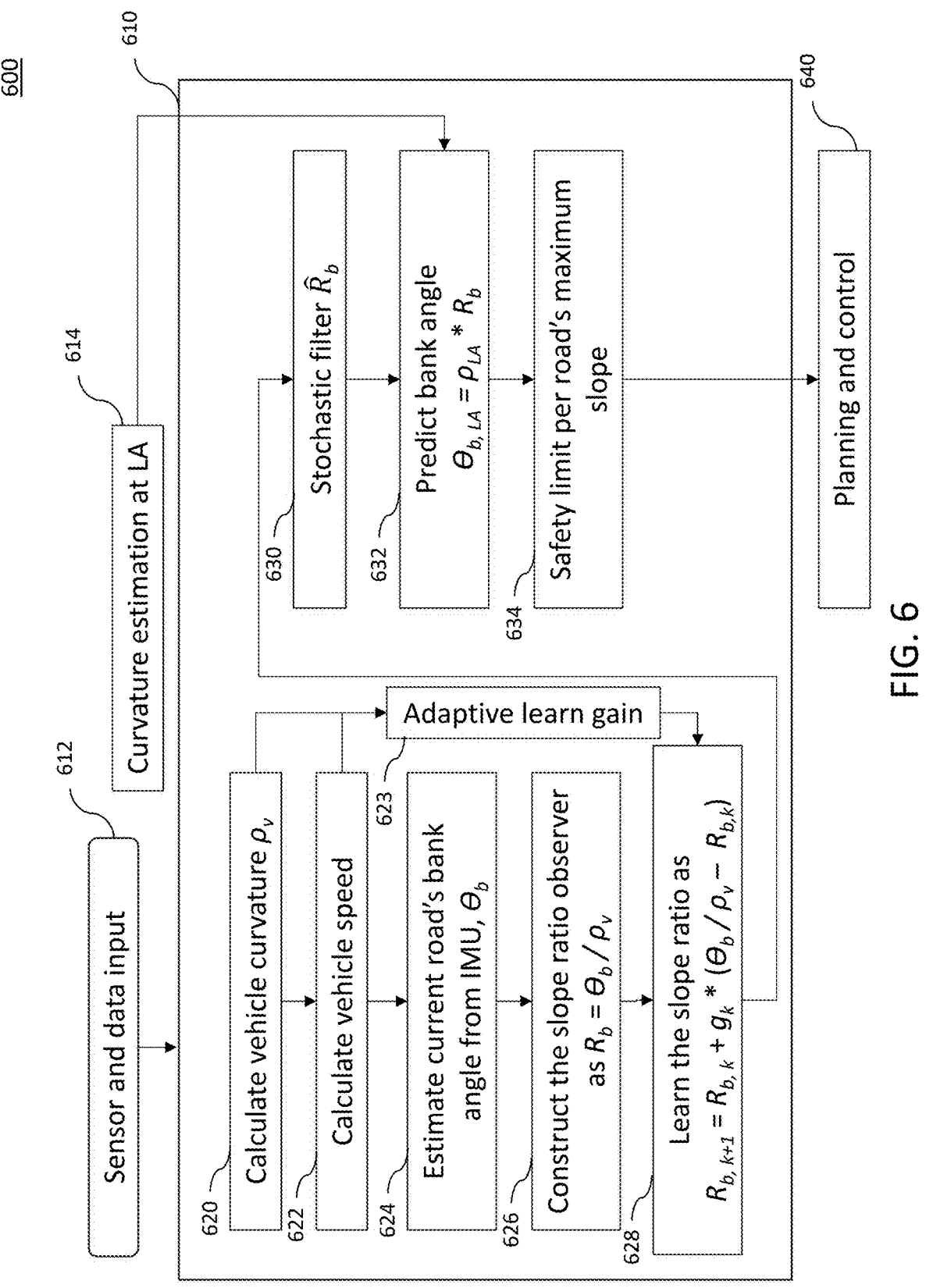
FIG. 6 depicts the bank detection observer for the detection and prediction of vehicle control for cross-slope control on an unmapped road, in accordance with the disclosure.

FIG. 6 depicts the bank prediction observer 600 discussed in FIG. 5, according to an embodiment of the present disclosure. As shown in FIG. 5, bank prediction observer 532 may receive inputs from other sensors, for example, front camera module 536 and vehicle path estimator 538. FIG. 6 depicts bank prediction observer 610 as accepting sensor and data input 612, which may also include other vehicle sensors as would be known by one of ordinary skill in the art. Given these vehicle sensor inputs, bank prediction observer 610 may include calculating vehicle curvature $\rho_v$ 620 based on, for example, images captured by a camera from look ahead points. As discussed in FIG. 1, vehicle curvature $\rho_v$ is the amount of angular displacement of a vehicle on a roadway curve, typically produced by an offset of steering control, for example, in driving through a turn or curve. Vehicle curvature $\rho_v$ along with other vehicle parameters may be used to compensate for bank angles encountered within a roadway at multiple look-ahead points. One of those parameters may include the speed of the vehicle, for example, as captured by one or more vehicle sensors and shown as vehicle speed 622.

In addition to the front camera module 536 to capturing upcoming road curvature, that information combined with a vehicle's inertial measurement unit may estimate current road's bank angle IMU, $\theta_b$ 624. In this manner, the bank prediction observer 610 may utilize a vehicle's current bank angle and look ahead curvature to predict an upcoming bank angle.

Given that the bank prediction observer 610 may calculate vehicle curvature $\rho_v$ and in conjunction with a current road's bank angle from the IMU, $\theta_b$, 624 the bank prediction observer 610 may then calculate a slope ratio observer, thus able to construct the slope ratio observer as $R_b = \theta_b/\rho_v$ 626. Further, the bank prediction observer 610 may then, given an adaptive learn gain 623, predict, or learn, the next slope ratio as learn the slope ratio 628 as $R_{b,k+1} = R_{b,k} + g_k*(\theta_b/\rho_v - R_{b,k})$, where $g_k$ represents the adaptive learn gain 623.

The output of the learn the slope ratio 628 may then be applied to a filtering process at stochastic filter $\hat{R}_b$ 630. The theory of stochastic processes may be a filtering process that assists in determining the state of a system from an incomplete and potentially noisy set of observations as would be known by one of ordinary skill in the art. The bank prediction observer 610 may then perform a prediction of upcoming banking angles, or cross-slope characteristics, at upcoming look ahead points. For example, to predict bank angle $\theta_{b,LA} = \rho_{LA}*R_b$ 632, which may also include input from the curvature estimation at look-ahead 614 that may be based on additional sensor data input, for example, image input from the front camera module 536.

At an upper limit per road's maximum slope 634 the system may check to see if the predicted one or more bank angles at multiple look-ahead points exceeds a threshold limit, for example, the upper limit per the road's maximum slope. If such a situation may occur, the system may take counter measures including feedback to the driver, control signals to various vehicle components, or other actions deemed appropriate. At planning and control 640 the bank prediction observer 610 may then output estimated bank angles at look ahead points 545 on a roadway as shown in FIG. 5, including other applicable control information.

Figure 7:
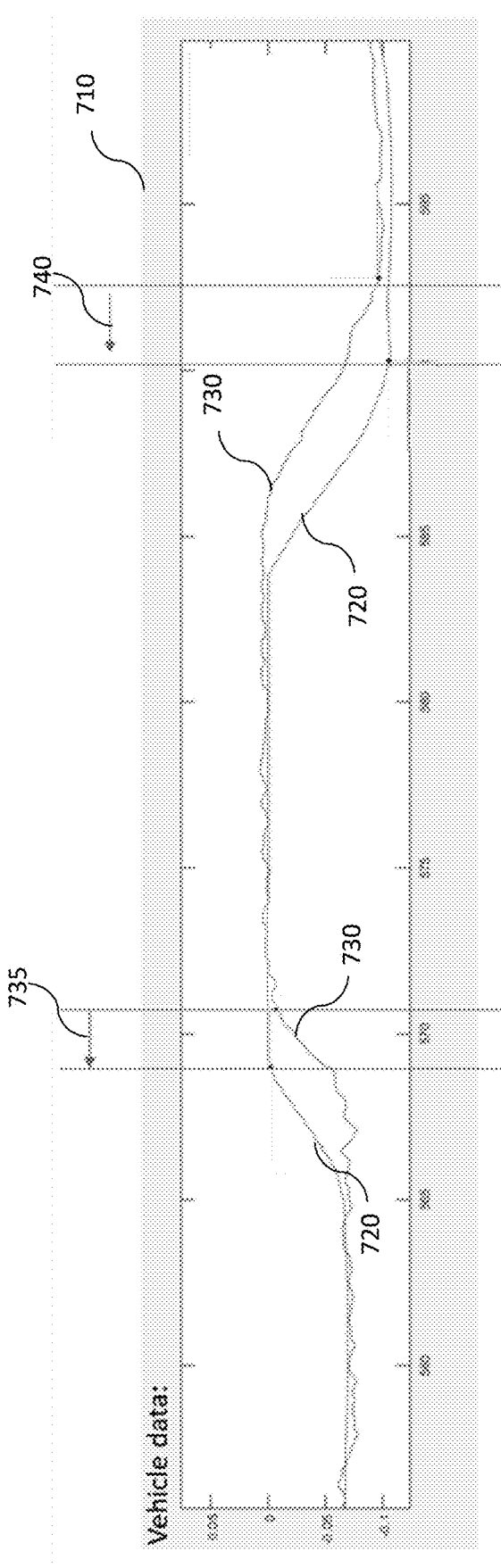
FIG. 7 depicts the effects of predictive vehicle road bank control versus reactive vehicle road bank control, in accordance with the disclosure.

FIG. 7 shows a comparison of detected banking information from the IMU with predictive vehicle road bank control, according to an embodiment of the present disclosure. Graph 710 illustrates vehicle data with time plotted in the X-axis and angular banking angle, in radians, in the y-axis. Plot 720 represents predictive vehicle road bank control as described and discussed in FIG. 5 and FIG. 6. Plot 730 represents the reactive vehicle road bank control based on internal vehicle IMU data as illustrated in FIG. 3B. Note that the plot 720 plot leads the reactive plot 730 at interval 735 and interval 740, which is approximately two seconds.

Figure 8:
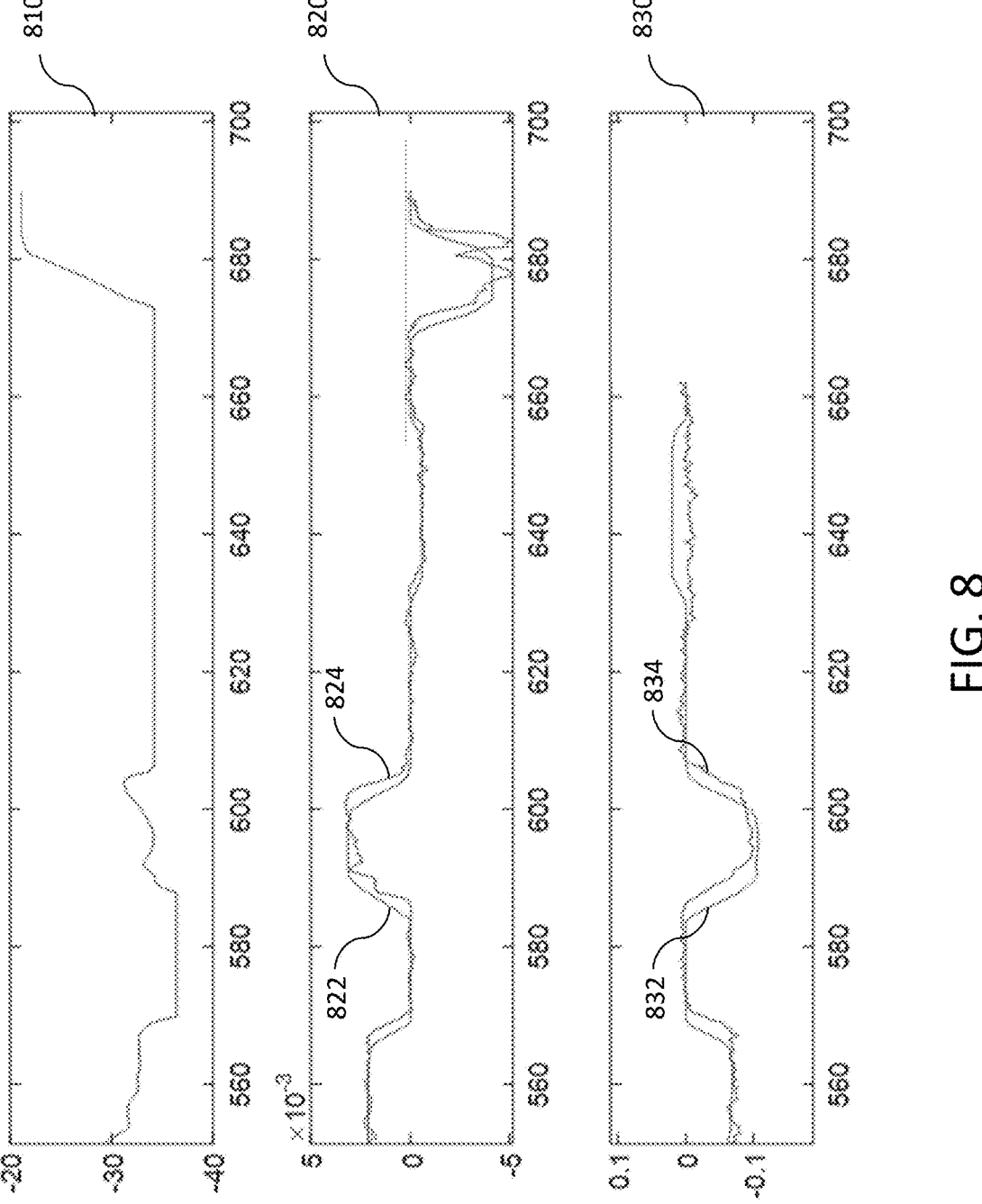
FIG. 8 depicts test results of predictive vehicle road bank control versus reactive vehicle road bank control, in accordance with the disclosure.

FIG. 8 represents test results of predictive vehicle road bank control versus reactive vehicle road bank control, according to an embodiment of the present disclosure. Graph 810 represents bank angle prediction ratio as described in this disclosure, which may also be referred to as the slope ratio of $R_b = \theta_b/\rho_v$, where $R_b$ represents a learned roadway cross-slope ratio, $\theta_b$ represents a cross-slope bank angle of a roadway from an inertial measurement unit, and $\rho_v$ represents an estimated vehicle curvature based on sensor information, for example, image information from a camera. Further, $R_b$ may be referenced in terms of radians/meter.

Graph 820 represents vehicle curvature where plot 822 represents $\rho_{LA}$, a predictive curvature of the vehicle at one or more look-ahead points and plot 824, a current curvature of the vehicle using an IMU as the data source.

Graph 830 represents bank angles where plot 832 represents predictive banking as described in this disclosure at one or more look ahead points. In contrast, plot 834 represents the current road bank estimation from sensors, for example from IMU data by the vehicle after encountering a banking angle in addition to wheel speed sensor data. Again, note that the predictive data precedes the reactive data.

FIG. 9 shows an exemplary embodiment of method 900 for predictive vehicle road bank control on an unmapped road, according to an embodiment of the present disclosure. Method 900 begins at step 905 by receiving, based on sensor data within a vehicle, upcoming cross-slope roadway characteristics of an unmapped road, wherein the unmapped road comprises an absence of available cross-slope roadway characteristics. As discussed in general in FIG. 3A, roads may be considered "mapped" or "unmapped." Mapped roads may contain images, such as a satellite image, of a road thereby creating a map that may be used by a vehicle's navigation system to plan a route from one destination to another. The map may also include other information such as imbedded metadata that contain information about the roadway such as latitude and longitude coordinates, road names, toll information, speed limits, tight curve warnings, road composition, road banking angles, and curve radiuses. In such a situation, as discussed in FIG. 5, the present disclosure may use such mapped data, for example, mapped road bank estimation system 510. However, if a roadway does not have such information available, it may be considered to be "unmapped." In such a situation, the present disclosure discussed the use, for example in FIG. 5, of unmapped road bank estimation system 530. Unmapped road bank estimation system 530 may use existing vehicle sensors, such as front camera module 536, combines with the current path of the vehicle, to capture roadway characteristics at one or more look-ahead points to estimate a bank angle and slope ratio, for example, by constructing the slope ratio observer as $R_b = \theta_b/\rho_v$ 626, and by estimating an upcoming slope ratio, for example, the learn slope ratio 628, $R_{b,k+1} = R_{b,k} + g_k*(\theta_b/\rho_v - R_{b,k})$. Further, such banking angles, or cross-slope roadway characteristics, may be obtained using alternative technologies and techniques, for example by use of a light detecting and ranging (LIDAR) sensor, or other sensors as would be known by one of ordinary skill in the art.

At step 910, the method may include creating, by the vehicle, a road model map based on the upcoming cross-slope roadway characteristics of the unmapped road. As shown in FIG. 5, the road model is targeted to proactively estimate the banking angles at different look ahead points without the prior knowledge of a roadway, in real-time. Further, the road model may be created and learned in real-time. For example, as shown in FIG. 3B, during the prediction phase 390, vehicle sensors may be used to acquire actual bank angles at look ahead points. Then, during period 395, also referred to as a "learning phase", the road model may estimate and develop future predictions for the bank angles and explicitly and proactively compensate for such bank angles. As shown in FIG. 6, predictions, or estimations, for upcoming banking angles may be expressed as learning the slope ratio as $R_{b,\ k+1}=R_{b,k}+g_k*(\theta_b/\rho_v-R_{b,k})$.

At step 915, the method may include predicting, based on the road model map, one or more bank angles at multiple look-ahead points of the upcoming roadway. Use of the road model map allows for the explicit and proactive compensation for upcoming roadway banking angles, or cross-slope characteristics. As shown in FIG. 8, proactive compensation versus reactive compensation allows the vehicle to anticipate and compensate for changes in the roadway prior to actually encountering the changes. The system targets multiple look-ahead points for the upcoming roadway such that an "optimal" path may be steered by the vehicle, for example, path 335 in FIG. 3B versus the reactive path 337 that may rely on after-the-fact data such as from the vehicle's IMU. Further, the proactive compensation may also utilize, if available, data from a high-definition map to further assist in computing and generating compensating steering control signals.

At step 920, the method may include generating, by the vehicle, based on the predicting of one or more bank angles, one or more steering control signals to compensate for the one or more bank angles at the multiple look-ahead points. As discussed in FIG. 5, the steering feedback control system 582 may accept input from the trajectory control system 560, which may accept input from the bank prediction observer 532, also discussed in FIG. 6, that generates actual and predicted bank angles at look ahead points. This information, ultimately used by the steering feedback control system 582, along with other parameters, may be used to generate a steering actuator input signal 588, to compensate for the one or more bank angles at the multiple look-ahead points. The generating the one or more steering control signals may also include inputs from a wheel speed sensor, an inertial measurement unit, and a steering angle sensor.

The method may also include predicting a bank angle of an upcoming roadway based on a current road bank angle from an inertial measurement unit and on a look ahead vehicle curvature. Further, as discussed in FIG. 6, the system may check to see if the predicted one or more bank angles at multiple look-ahead points exceeds a threshold limit, for example, the upper limit per the road's maximum slope. If such a situation may occur, the system may take counter measures including feedback to the driver, control signals to various vehicle components, or other actions deemed appropriate.

Method 900 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for predictive vehicle road bank control on an unmapped road, the method comprising:

receiving, based on sensor data generated by a sensor of a vehicle, upcoming cross-slope roadway characteristics of the unmapped road, wherein the unmapped road comprises an absence of known cross-slope roadway characteristics;

creating, by the vehicle, a road model map based on the upcoming cross-slope roadway characteristics of the unmapped road;

predicting, based on the road model map, one or more bank angles at multiple look-ahead points of the unmapped road, wherein predicting the one or more bank angles of the multiple look-ahead points is based on a look-ahead vehicle curvature and a current road bank angle received from an inertial measurement unit of the vehicle; and generating, by the vehicle based on the one or more bank angles, one or more steering control signals to compensate for the one or more bank angles at the multiple look-ahead points.

2. The method of claim 1, wherein the sensor data comprises data from a front camera module.

3. The method of claim 1, wherein the sensor data comprises data from a light detecting and ranging (LIDAR) sensor.

4. The method of claim 1, wherein the generating the one or more steering control signals includes inputs from a wheel speed sensor, an inertial measurement unit, and a steering angle sensor.

5. The method of claim 1, wherein the predicting of the one or more bank angles at the multiple look-ahead points of the unmapped road comprises inputs from a high-definition map.

6. The method of claim 1, further comprising recursive learning of the road model map for future predictions of cross-slope roadway characteristics.

7. The method of claim 1, further comprising calculating a slope ratio of $R_b=\theta_b/\rho_v$, where $R_b$ represents a learned roadway cross-slope ratio, $\theta_b$ represents a cross-slope bank angle of a roadway from an inertial measurement unit, and $\rho_v$ represents an estimated vehicle curvature based on inertial measurement unit data and a speed of the vehicle.

8. The method of claim 1, further comprising predicting a bank angle of an upcoming roadway where $\theta_{b,LA} = \rho_{LA} * R_b$, in which $\theta_{b,LA}$ represents a predicted cross-slope bank angle of a roadway at one or more look-ahead points, $\rho_{LA}$ represents a curvature of the vehicle at one or more look-ahead points, and $R_b$ represents a learned roadway cross-slope ratio.

9. The method of claim 1, further comprising determining if the predicted one or more bank angles at the multiple look-ahead points exceeds a threshold limit.

10. A system for predictive vehicle road bank control on an unmapped road, the system comprising:

a sensor, within a vehicle, configured to capture upcoming cross-slope roadway characteristics of the unmapped road, wherein the unmapped road comprises an absence of known cross-slope roadway characteristics;

a trajectory control system, within the vehicle, configured to generate a road model map based on the upcoming cross-slope roadway characteristics of the unmapped road;

a bank prediction observer, within the vehicle, configured to predict, based on the road model map, one or more bank angles at multiple look-ahead points of the unmapped road, wherein predicting the one or more bank angles of the multiple look-ahead points is based on a look-ahead vehicle curvature and a current road bank angle received from an inertial measurement unit of the vehicle; and a steering control system, within the vehicle, configured to generate, based on the one or more bank angles, one or more steering control signals to compensate for the one or more bank angles at the multiple look-ahead points.

11. The system of claim 10, wherein the sensor comprises a front camera module.

12. The system of claim 10, wherein the sensor comprises a light detecting and ranging (LIDAR) sensor.

13. The system of claim 10, wherein the steering control system comprises a wheel speed sensor, the inertial measurement unit, and a steering angle sensor.

14. The system of claim 10, wherein the bank prediction observer is configured to receive a high-definition map, and wherein the high-definition map assists in the predicting, based on the road model map, the one or more bank angles at the multiple look-ahead points of the unmapped road.

15. The system of claim 10, wherein the steering control system is further configured to receive steering feedback control from the trajectory control system to generate a model-based steering feed forward control.

16. The system of claim 10, further comprising an actuator control system configured to receive the one or more steering control signals and effectuate one or more vehicle steering actions.

17. The system of claim 10, wherein the trajectory control system is further configured to receive an understeer coefficient learning data.

18. The system of claim 10, wherein the trajectory control system is further configured to receive a tire cornering stiffness learning data.

19. A method for predictive vehicle road bank control on an unmapped road, the method comprising:

receiving, based on sensor data within a vehicle, upcoming cross-slope roadway characteristics of the unmapped road, wherein the unmapped road comprises an absence of known cross-slope roadway characteristics, and wherein the sensor data comprises data from a front camera module or a light detecting and ranging (LIDAR) sensor;

creating, by the vehicle, a road model map based on the upcoming cross-slope roadway characteristics of the unmapped road;

predicting, based on the road model map, one or more bank angles at multiple look-ahead points of the unmapped road, wherein the predicting of the one or more bank angles at the multiple look-ahead points of the unmapped road comprises inputs from a high definition map, an inertial measurement unit, and the front camera module of the vehicle;

generating, by the vehicle, based on the one or more bank angles, one or more steering control signals to compensate for the one or more bank angles at the multiple look-ahead points, wherein the generating the one or more steering control signals comprises inputs from a wheel speed sensor, the inertial measurement unit, and a steering angle sensor; and determining if the predicted one or more bank angles at the multiple look-ahead points exceeds a threshold limit.

20. The method of claim 19, wherein predicting the one or more bank angles is further based on a current road bank angle from the inertial measurement unit and on a look-ahead vehicle curvature.

\* \* \* \* \*